(12) United States Patent
Song et al.

(10) Patent No.: US 11,409,357 B2
(45) Date of Patent: Aug. 9, 2022

(54) NATURAL HUMAN-COMPUTER INTERACTION SYSTEM BASED ON MULTI-SENSING DATA FUSION

(71) Applicant: SOUTHEAST UNIVERSITY, Jiangsu (CN)

(72) Inventors: Aiguo Song, Jiangsu (CN); Hui Zhang, Jiangsu (CN); Yuqing Yu, Jiangsu (CN); Huanhuan Qin, Jiangsu (CN); Huijun Li, Jiangsu (CN); Baoguo Xu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 203 days.

(21) Appl. No.: 16/475,384

(22) PCT Filed: May 23, 2018

(86) PCT No.: PCT/CN2018/088077
§ 371 (c)(1),
(2) Date: Jul. 2, 2019

(87) PCT Pub. No.: WO2019/024577
PCT Pub. Date: Feb. 7, 2019

(65) Prior Publication Data
US 2021/0132681 A1    May 6, 2021

(30) Foreign Application Priority Data

Aug. 1, 2017  (CN) .......................... 201710646851.7

(51) Int. Cl.
*G06F 3/01*    (2006.01)
(52) U.S. Cl.
CPC .............. *G06F 3/011* (2013.01); *G06F 3/016* (2013.01)

(58) Field of Classification Search
CPC ...................................................... G06F 3/011
See application file for complete search history.

(56) References Cited

U.S. PATENT DOCUMENTS

| 9,690,376 B2* | 6/2017 | Davis | G06F 3/014 |
| 2009/0209343 A1* | 8/2009 | Foxlin | G06F 3/0346 |
| | | | 463/36 |

(Continued)

FOREIGN PATENT DOCUMENTS

| CN | 103488291 | 1/2014 |
| CN | 106648116 | 5/2017 |

(Continued)

OTHER PUBLICATIONS

"International Search Report (Form PCT/ISA/210) of PCT/CN2018/088077," dated Aug. 29, 2018, with English translation thereof, pp. 1-4.

*Primary Examiner* — Nelson M Rosario
*Assistant Examiner* — Scott D Au
(74) *Attorney, Agent, or Firm* — JCIPRNET

(57) ABSTRACT

A natural human-computer interaction system based on multi-sensing data fusion comprises a MEMS anti tracking device, a visual tracking device, a force feedback device and a PC terminal. The MEMS arm tracking device is composed of three sets of independent MEMS sensors for collecting arm joint angle information and measuring an arm motion trajectory. The visual tracking device is composed of a binocular camera for collecting image information and measuring a finger motion trajectory. The force feedback device is mounted in a palm of an operator for providing a feedback force to the finger. The PC terminal comprises a data display module, an arm motion calculating module, an image processing module, a mechanics calculating module and a virtual scene rendering module. The system tracks the arm (Continued)

motion trajectory and the finger motion trajectory of the operator and provides force feedback interaction to the finger of the operator.

1 Claim, 2 Drawing Sheets

(56) References Cited

U.S. PATENT DOCUMENTS

2014/0104156 A1* 4/2014 Touma ................ G06F 3/04815
                                                                        345/156
2016/0320871 A1* 11/2016 Li ............................ G06F 1/163

FOREIGN PATENT DOCUMENTS

| CN | 106779045 | 5/2017 |
| CN | 107632699 | 1/2018 |

* cited by examiner

NATURAL HUMAN-COMPUTER INTERACTION SYSTEM BASED ON MULTI-SENSING DATA FUSION

CROSS-REFERENCE TO RELATED APPLICATION

This application is a 371 of international application of PCT application serial no. PCT/CN2018/088077, filed on May 23, 2018, which claims the priority benefit of China application no. 201710646851.7, filed on Aug. 1, 2017. The entirety of each of the above mentioned patent applications is hereby incorporated by reference herein and made a part of this specification.

TECHNICAL FIELD

The present invention relates to a natural human-computer interaction system, and more particularly, to a natural human-computer interaction system based on multi-data fusion of a MEMS sensor, a binocular camera, a force feedback controller and the like.

BACKGROUND

Since the invention of computer, various human-computer interaction devices have emerged. From the inventions of characters, keyboards to mice, and then to the emergence of multimedia interactive devices, voice recognition technologies and electroencephalogram detection technologies, human-computer interaction means have been continuously innovated and become more and more natural and intelligent.

However, the motions of a human body involve in many parts, including the motion of the whole human body or the motion of a certain part, such as hand motion, leg motion or head motion, even the expression and gesture of human. These motions have their own characteristics and different complexities, and the identification methods and research methods used are also different. For traditional human-computer interaction devices, although they have superior performance in some aspects, they also have their own limitations. For example, although the human-computer interaction device based on visual information can realize high-precision non-contact interaction, the algorithm is high in complexity, with large computation and poor real-time performance; the natural human-computer interaction system based on MEMS sensors has strong real-time performance in detection, but the sensors must be mounted in contact with the operator, which is not conducive to the mounting in intensive parts of the joints; and the human-computer interaction device based on ultrasonic positioning has a long detection distance, but is easily affected by obstacles, and has poor anti-interference performance.

Therefore, the problems above need to be solved urgently.

SUMMARY

Object of the invention: the present invention is intended to provide a natural human-computer interaction system based on multi-sensing data fusion. The system tracks an arm motion trajectory of an operator by taking advantage of wide measurement range of a MEMS sensor and tracks a finger motion trajectory of the operator by taking advantage of high precision of visual interaction. Meanwhile, the system provides force feedback interaction to the finger of the operator by means of a force feedback device. The system can effectively improve the efficiency of human-computer interaction and enhance the immersion experience of the operator.

Technical solution: a natural human-computer interaction system based on multi-sensing data fusion, characterized in that, comprises a MEMS arm tracking device, a visual tracking device, a force feedback device and a PC terminal. The MEMS arm tracking device is composed of three sets of independent MEMS sensors for collecting arm joint angle information and measuring an arm motion trajectory. The visual tracking device is composed of a binocular camera for collecting image information and measuring a finger motion trajectory. The force feedback device is mounted in a palm of an operator for providing a feedback force to the finger. The PC terminal comprises a data display module, an arm motion calculating module, an image processing module, a mechanics calculating module and a virtual scene rendering module.

The MEMS arm tracking device is composed of three sets of independent MEMS sensors for collecting a Euler angle of an arm joint and measuring an arm motion trajectory.

Preferably, the visual tracking device is composed of a binocular camera for collecting image information and measuring a finger motion trajectory.

Moreover, the force feedback device is composed of a linear motor, a force sensor and a mechanical handle, and mounted in a palm of an operator for providing a feedback force to the finger.

Furthermore, the PC terminal comprises a data display module, an arm motion calculating module, an image processing module, a mechanics calculating module and a virtual scene rendering module.

Beneficial effects: compared with the prior art, the present invention has the following significant advantages: firstly, the present invention can measure the Euler angle of the arm joint of the operator by the MEMS sensor, and can meet tracking requirements on the arm motion trajectory under the condition of large-range arm motion; secondly, the present invention can measure the finger motion trajectory of the operator by image information, and can accurately measure angles of multiple joints in the finger; and thirdly, the present invention can provide the operator with force feedback to enhance the immersion and interactivity of the system.

DETAILED DESCRIPTION

The technical solution of the present invention is further described hereinafter with reference to the drawings. The present invention is a natural human-computer interaction system based on multi-sensing data fusion, wherein an executing mechanism thereof comprises a MEMS arm tracking device, a visual tracking device, a force feedback device and a PC terminal. The MEMS arm tracking device is composed of three groups of independent MEMS sensors, which are respectively used for measuring Euler angles of shoulder, elbow and wrist joints and tracking an arm motion trajectory. The visual tracking device is composed of a binocular camera for collecting image information and measuring a finger motion trajectory. The force feedback device is mounted in a palm of an operator for providing force feedback to the finger. The PC terminal comprises a data display module, an arm motion calculating module, an image processing module, a mechanics calculating module and a virtual scene rendering module.

Figure 1:
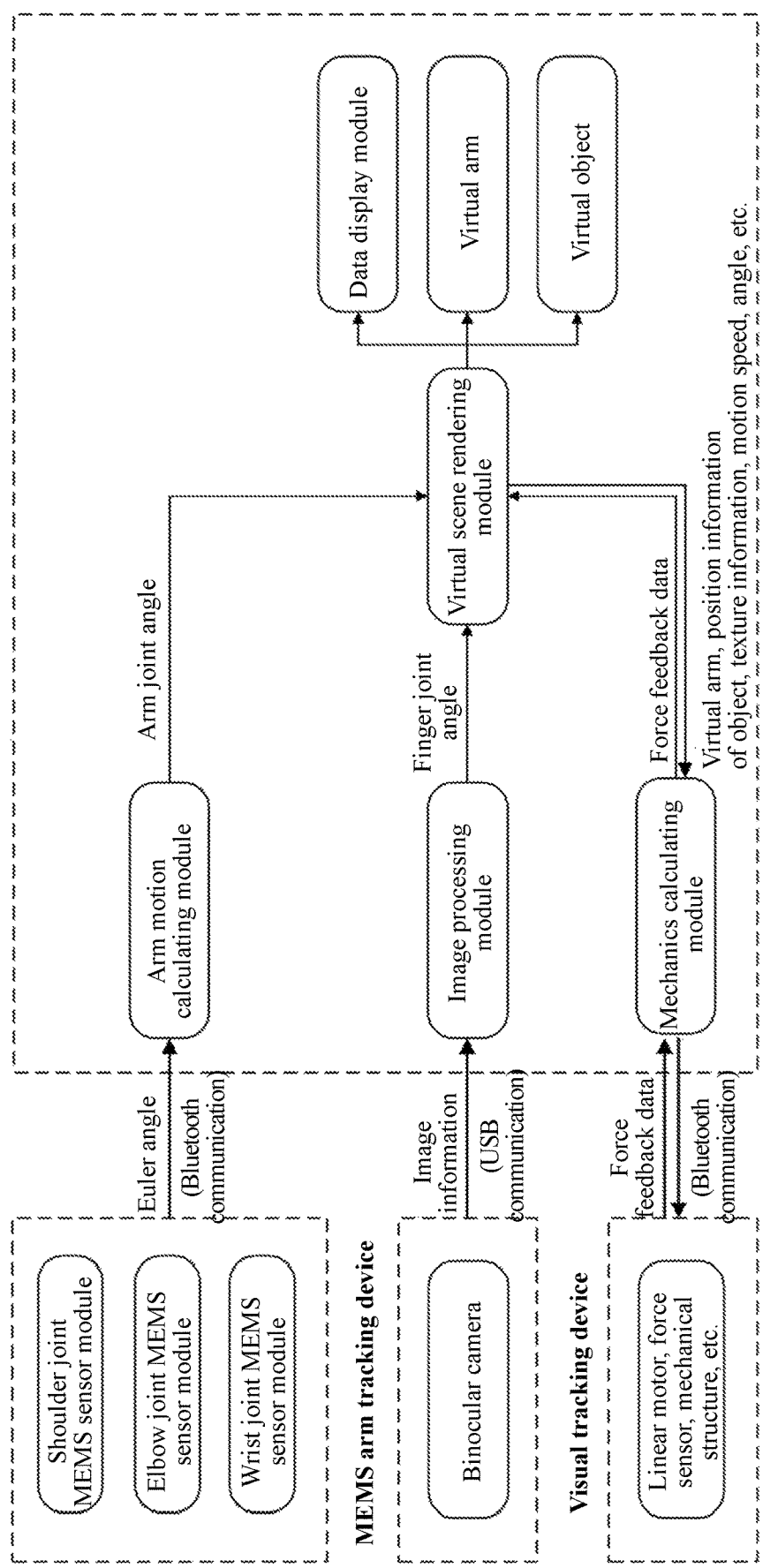
FIG. 1 is an execution flow chart of the present invention.
Figure 2:
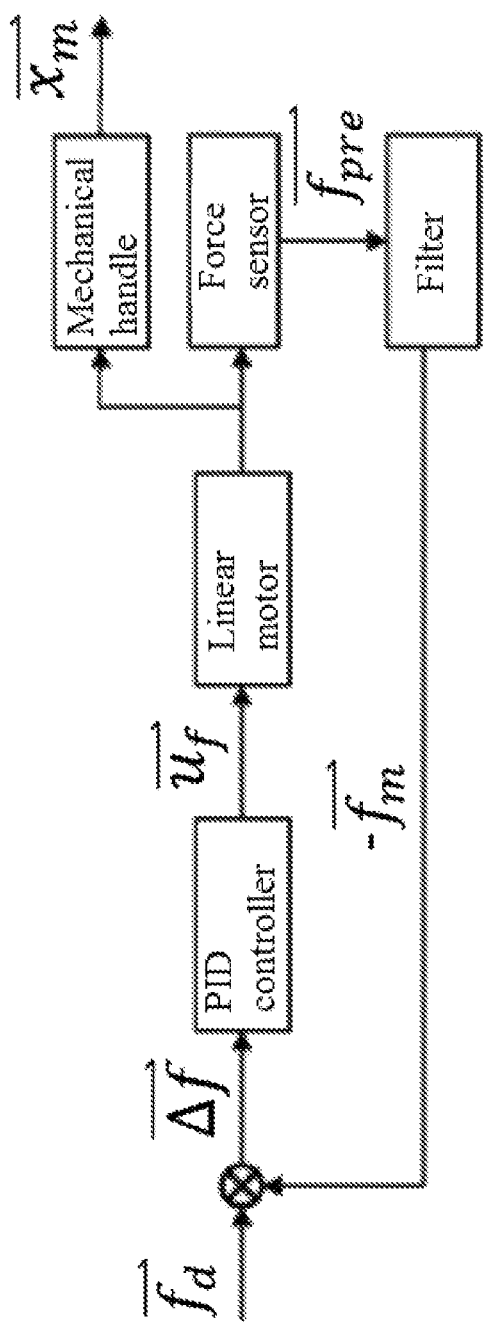
FIG. 2 is a working flow chart of a force feedback device.

Working process: the present invention comprises a MEMS arm tracking device, a visual tracking device, a force feedback device and a PC terminal. The MEMS arm tracking device is composed of three groups of independent MEMS sensors, which are respectively used for measuring Euler angles of shoulder, elbow and wrist joints and tracking an arm motion trajectory. The visual tracking device is composed of a binocular camera for collecting image information and measuring a finger motion trajectory. The force feedback device is mounted in a palm of an operator for providing force feedback to the finger. The PC terminal comprises a data display module, an arm motion calculating module, an image processing module, a mechanics calculating module and a virtual scene rendering module. After the whole system is powered on, all the modules are initialized. During initialization, the arm tracking device can configure the MEMS sensors according to a program, and a Bluetooth communication device can be automatically connected with the PC terminal; the visual tracking device is connected with the PC through a USB interface, and the binocular camera thereof checks hardware equipment and attempts to capture images; the force feedback device can set force sensor parameters according to a preset program to control the motor to adjust the posture; and each module of the PC terminal also enters a preparation state, and the virtual scene rendering module constructs an initial virtual scene. After initialization, the arm tracking device is mounted in an arm of the operator, the three groups of independent MEMS sensors are respectively fixed in an upper arm, a forearm and a palm of the operator for measuring the Euler angles of the shoulder, elbow and wrist joints, the force feedback device is fixed in the palm of the operator and bound with the palm, and the visual tracking device is fixed directly below the arm of the operator with a vertically upward lens for capturing the image information of the palm. During working, the arm tracking device reads data collected by the MEMS sensors according to a fixed frequency, converts a data format into more intuitive Euler angle, and then sends the data to the PC terminal through Bluetooth. The visual tracking device collects images according to a fixed frequency, and sends the images after compression. The arm motion calculating module of the PC terminal calculates a real-time motion trajectory of a tail end of the palm in a three-dimensional space coordinate system by combining the received Euler angle data with preset sizes of the upper arm, the forearm and the palm; the image processing module automatically identifies the palm the image of which is received, calculates the angle of each joint of the palm, and tracks the finger motion trajectory; the virtual scene rendering module renders the motion of the virtual arm in real time according to the arm motion trajectory and the finger motion trajectory calculated, when a virtual finger touches a virtual object, the mechanics calculating module can calculate a due expected feedback force vector $\vec{f_d}$ of the operator under the current state according to a touch mode, a speed, an angle, etc., and sends the data to the force feedback device. FIG. 2 is a working flow chart of a force feedback device, wherein a sensor of the force feedback device can measure a current stress condition $\vec{f_{pre}}$ of the finger of the operator in real time, obtain $\vec{f_m}$ after filtering, and feed back the signal to a control system to form a feedback loop. At the moment, a difference between an expected acting force $\vec{f_d}$ and an actual acting force $\vec{f_m}$ is $\Delta \vec{f}$, then an excitation signal $\vec{u_f}$ for controlling a motor is calculated through a PID controller, and finally a linear motor continuously adjusts a displacement $\vec{x_m}$ of a rotor according to the expected feedback force $\vec{f_d}$ and the current feedback force $\vec{f_m}$ to realize accurate force feedback interaction. Meanwhile, the data display module of the PC terminal can also display key information such as an arm joint angle, a palm joint angle and a feedback force in real time.

What is claimed is:

1. A natural human-computer interaction system based on multi-sensing data fusion, comprising:
   a MEMS arm tracking device;
   a visual tracking device;
   a force feedback device; and
   a PC terminal,
   wherein the MEMS arm tracking device is composed of three sets of independent MEMS sensors which are respectively fixed in an upper arm, a forearm and a palm of an operator for collecting arm joint angle information which includes Euler angles of shoulder, elbow and wrist joints, and measuring an arm motion trajectory,
   the visual tracking device is composed of a binocular camera which is fixed directly below an arm of the operator for collecting image information of a palm and measuring a finger motion trajectory,
   the force feedback device is composed of a linear motor, a force sensor and a mechanical handle and is mounted in the palm of the operator for providing a feedback force to the finger,
   the PC terminal comprises a data display module, an arm motion calculating module, an image processing module, a mechanics calculating module and a virtual scene rendering module, and
   wherein the natural human-computer interaction system collects the arm joint angle information and the image information of the palm when the arm of the operator moves, and send the data to the PC terminal, the PC terminal calculates a motion trajectory of a tail end of the palm according to the Euler angles and sizes of an upper arm, a forearm and a palm of a virtual arm, and calculates the finger motion trajectory according to the image information of the palm, the motion of each joint of the arm and the finger of the operator is mapped onto the virtual arm to enable the virtual arm to make corresponding motion, as a result, the operator can interact with an object in a virtual scene, and the mechanics calculating module of the PC terminal can calculate force feedback data according to real-time interaction information and send the data to the force feedback module to provide force feedback for a user.

* * * * *